(12) United States Patent
Kubes

(10) Patent No.: US 9,000,644 B2
(45) Date of Patent: *Apr. 7, 2015

(54) CONCENTRIC MOTOR POWER GENERATION AND DRIVE SYSTEM

(75) Inventor: Larry Kubes, Indianapolis, IN (US)

(73) Assignee: Remy Technologies, L.L.C., Pendleton, IN (US)

(*) Notice: Subject to any disclaimer, the term of this patent is extended or adjusted under 35 U.S.C. 154(b) by 312 days.

This patent is subject to a terminal disclaimer.

(21) Appl. No.: 13/488,971

(22) Filed: Jun. 5, 2012

(65) Prior Publication Data

US 2013/0320789 A1    Dec. 5, 2013

(51) Int. Cl.

| H02K 47/00 | (2006.01) |
|---|---|
| B60K 1/00 | (2006.01) |
| B60K 6/26 | (2007.10) |
| B60K 6/46 | (2007.10) |
| H02K 7/00 | (2006.01) |
| H02K 16/00 | (2006.01) |
| H02K 51/00 | (2006.01) |

(52) U.S. Cl.
CPC ... *B60K 6/46* (2013.01); *B60K 1/00* (2013.01); *B60K 6/26* (2013.01); *H02K 7/006* (2013.01); *H02K 16/00* (2013.01); *H02K 51/00* (2013.01); *Y02T 10/6217* (2013.01)

(58) Field of Classification Search
USPC .......................................... 310/112, 113, 114
See application file for complete search history.

(56) References Cited

U.S. PATENT DOCUMENTS

| 6,098,735 | A  * | 8/2000 | Sadarangani et al. ..... 180/65.24 |
|---|---|---|---|
| 6,257,027 | B1 * | 7/2001 | Imai ............................. 68/12.12 |
| 6,768,237 | B1 | 7/2004 | Schroedl |
| 6,903,471 | B2 * | 6/2005 | Arimitsu et al. ................. 310/59 |
| 6,936,933 | B2 | 8/2005 | Wilmore |
| 7,030,528 | B2 | 4/2006 | Morgante |
| 7,034,422 | B2 | 4/2006 | Ramu |
| 7,242,105 | B2 | 7/2007 | Mehl et al. |
| 7,259,493 | B2 * | 8/2007 | Oshidari et al. ....... 310/216.114 |
| 7,262,536 | B2 | 8/2007 | Rahman et al. |

(Continued)

FOREIGN PATENT DOCUMENTS

| DE | 102007001828 A1 | 7/2008 |
|---|---|---|
| DE | 102007025550 A1 | 12/2008 |

(Continued)

OTHER PUBLICATIONS

EP Search Report dated Jul. 23, 2012 for corresponding Application No. 11189670.0; 7 pages.

*Primary Examiner* — Hanh Nguyen
(74) *Attorney, Agent, or Firm* — Cantor Colburn LLP

(57) ABSTRACT

An apparatus is provided and includes a hub, including opposing faces, a first sidewall fixed to the opposing faces to define a first interior and a second sidewall fixed to one of the opposing faces to define a second interior within the first interior, a first assembly, disposed within the second interior, to generate current from input mechanical energy, a second assembly, electrically coupled to the first assembly and disposed within the first interior, to generate mechanical energy to be transmitted to external mechanical elements from current associated with the current generated by the first assembly and first and second couplings, the first coupling being disposed to mechanically couple the first and second assemblies and the second coupling being disposed to mechanically couple the second assembly and the external mechanical elements.

18 Claims, 4 Drawing Sheets

(56) References Cited

U.S. PATENT DOCUMENTS

| | | |
|---|---|---|
| 7,325,637 B2 | 2/2008 | Sadarangani |
| 7,402,923 B2 | 7/2008 | Klemen et al. |
| 7,591,748 B2 | 9/2009 | Holmes |
| 7,800,276 B2 | 9/2010 | Purvines |
| 8,742,641 B2 * | 6/2014 | Kubes et al. ............ 310/113 |
| 2001/0008354 A1 * | 7/2001 | Minagawa ............. 310/113 |
| 2004/0155554 A1 * | 8/2004 | Morgante .............. 310/266 |
| 2008/0023237 A1 | 1/2008 | Houle |
| 2008/0197730 A1 | 8/2008 | Himmelmann et al. |
| 2009/0250280 A1 | 10/2009 | Abe et al. |
| 2010/0025128 A1 * | 2/2010 | Abe et al. ............ 180/65.25 |
| 2010/0071974 A1 | 3/2010 | Akutsu et al. |
| 2010/0207471 A1 | 8/2010 | Hendrickson et al. |

FOREIGN PATENT DOCUMENTS

| | | |
|---|---|---|
| EP | 2072320 A1 | 6/2009 |
| FR | 2811267 A1 | 1/2002 |
| FR | 2865867 A1 | 8/2005 |
| WO | 9921263 A2 | 4/1999 |
| WO | 9939426 A1 | 8/1999 |
| WO | 0101550 A1 | 1/2001 |

* cited by examiner

CONCENTRIC MOTOR POWER GENERATION AND DRIVE SYSTEM

CROSS-REFERENCE TO RELATED APPLICATION

The subject matter disclosed herein is related to the subject matter disclosed in U.S. application Ser. No. 12/953,033, which was entitled "CONCENTRIC MOTOR POWER GENERATION AND DRIVE SYSTEM," and which was filed on Nov. 23, 2010. The entire contents of U.S. application Ser. No. 12/953,033 are incorporated herein by reference.

BACKGROUND OF THE INVENTION

The subject matter disclosed herein relates to a concentric motor power generation and drive system.

In many vehicles and, in particular, hybrid vehicles, power transmission systems are used for converting mechanical energy generated in an engine into electrical energy that can either be stored or converted back to mechanical energy that can be employed for driving purposes. These power transmission systems often include a generator rotor, which is driven to rotate by a drive shaft that is rotatably coupled to an engine, and a generator stator, which converts the rotor rotation into electrical energy. This electrical energy is either stored by a battery or transmitted to a drive stator, which induces rotation of a drive rotor that is, in turn, coupled to, for example, vehicle wheels.

Typically, in conventional power transmission systems, the generator elements and the drive elements are not mounted together and may be, in fact, disposed at different parts of a particular vehicle. Thus, there is a need to separately mount these features in such a vehicle in relatively heavy and complex arrangements. This leads to the vehicle itself being relatively heavy and less fuel economical than it otherwise could be.

BRIEF DESCRIPTION OF THE INVENTION

According to one aspect of the invention, an apparatus is provided and includes a hub, including opposing faces, a first sidewall fixed to the opposing faces to define a first interior and a second sidewall fixed to one of the opposing faces to define a second interior within the first interior, a first assembly, disposed within the second interior, to generate current from input mechanical energy, a second assembly, electrically coupled to the first assembly and disposed within the first interior, to generate mechanical energy to be transmitted to external mechanical elements from current associated with the current generated by the first assembly and first and second couplings, the first coupling being disposed to mechanically couple the first and second assemblies and the second coupling being disposed to mechanically couple the second assembly and the external mechanical elements.

According to another aspect of the invention, an apparatus is provided and includes a hub, including first and second opposing faces, a first sidewall fixed at opposite ends thereof to the first and second opposing faces to define a first interior between the first and second opposing faces and a second sidewall fixed to one of the first and second opposing faces to define a second interior within the first interior, a first assembly, disposed within the second interior, to generate current from input mechanical energy, a second assembly, electrically coupled to the first assembly and disposed within the first interior, to generate mechanical energy to be transmitted to external mechanical elements from current associated with the current generated by the first assembly and first and second couplings. The first coupling is disposed to mechanically couple the first and second assemblies. The second coupling is disposed to mechanically couple the second assembly and the external mechanical elements. The input mechanical energy is thus respectively transferable from the first assembly to the second assembly and from the second assembly to the external mechanical elements.

According to yet another aspect of the invention, an apparatus is provided and includes a hub, including opposing faces, a first sidewall fixed to the opposing faces to define a first interior and a second sidewall fixed to one of the opposing faces to define a second interior within the first interior, a first assembly, disposed within the second interior, to generate current from input mechanical energy, a second assembly, electrically coupled to the first assembly and disposed within the first interior, to generate mechanical energy to be transmitted to external mechanical elements from current associated with the current generated by the first assembly, a first coupling disposed to mechanically couple the first and second assemblies and a second coupling disposed to mechanically couple the second assembly and the external mechanical elements, the second coupling being operable in an open condition in a power generation mode.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
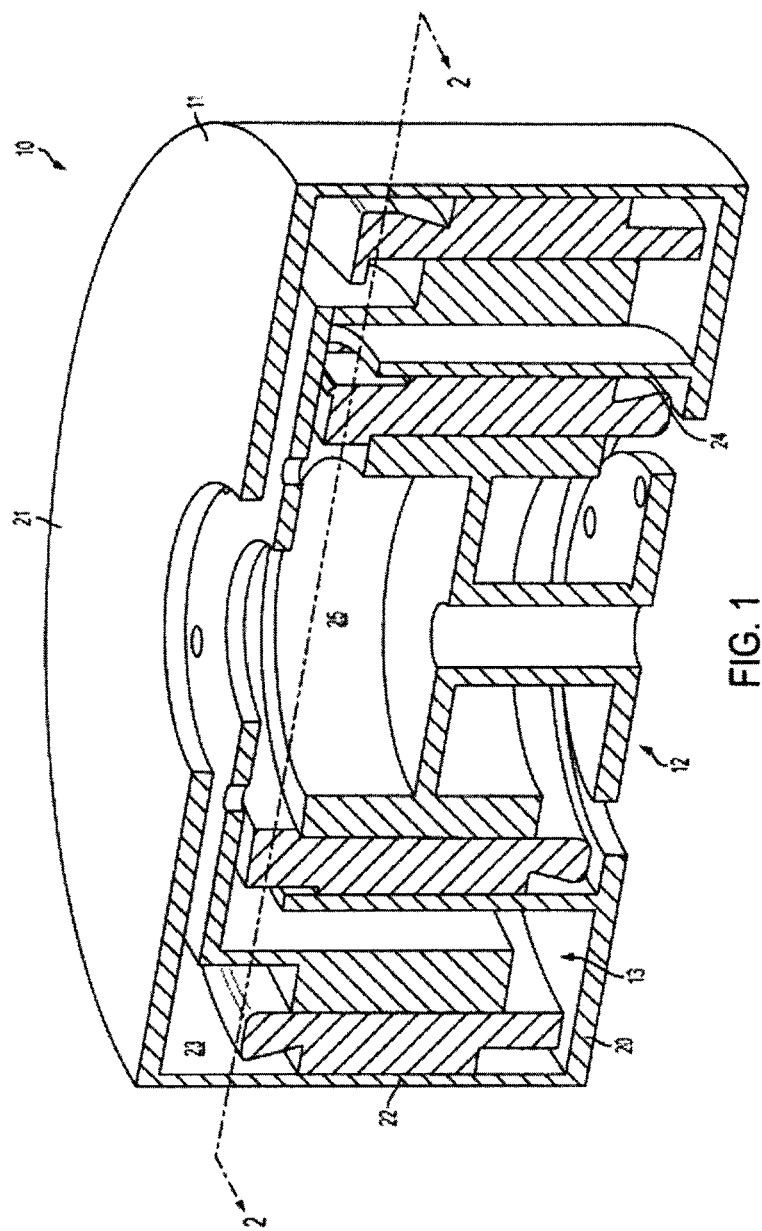
FIG. 1 is a perspective view of a concentric motor power generation and drive system apparatus.
Figure 2:
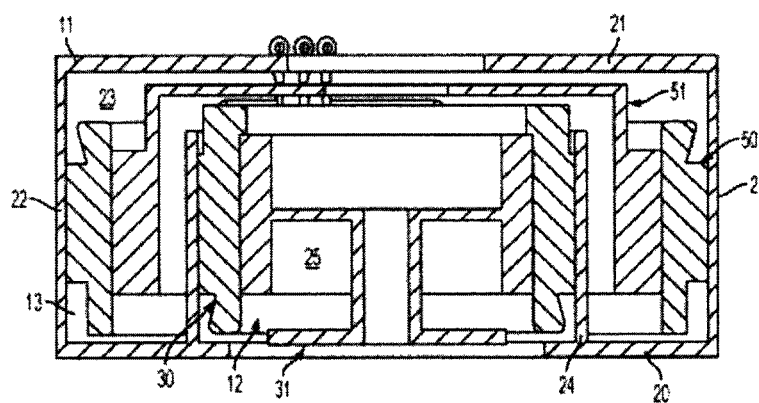
FIG. 2 is a view of the concentric motor power generation and drive system apparatus taken along lines 2-2 of FIG. 1.
Figure 3:
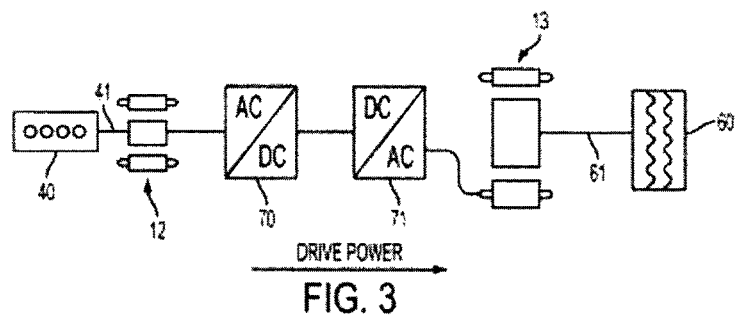
FIG. 3 is a schematic circuit diagram of the concentric motor power generation and drive system apparatus.

With reference to FIGS. 1-3, a concentric motor power generation and drive system apparatus 10 is provided. The apparatus 10 includes a hub 11, a first assembly 12 and a second assembly 13. The hub 10 includes first and second opposing faces 20, 21, a first sidewall 22 fixed at opposite ends thereof to the first and second opposing faces 20, 21 to define a first interior 23 between the first and second opposing faces 20, 21 and a second sidewall 24. The second sidewall 24 is fixed to one of the first and second opposing faces 20, 21 to define a second interior 25 within the first interior 23. The hub 10 may therefore be a housing and may be rigidly affixed to an engine, a drive power generation device or some similar type of mounting.

The first assembly 12 is disposed within the second interior 25 and is configured to generate electrical current from input mechanical energy. By contrast, the second assembly 13, which is electrically coupled to the first assembly 12, is disposed within the first interior 23 generally surrounding the second sidewall 24 and is configured to generate mechanical energy from current associated with the current generated by the first assembly 12.

In accordance with embodiments, the first and second sidewalls 22 and 24 may each be substantially cylindrical and, in some cases, substantially concentric with one another. The first and second assemblies 12 and 13 may also be substantially concentric with one another although portions of the second assembly 13 may be axially displaced from the corresponding portions of the first assembly 12. For example, where the second sidewall 24 is fixed to the first face 20, an end of the second assembly 13 corresponding to the second face 21 protrudes axially from a corresponding end of the first assembly 12.

With the arrangements described above, the first and second assemblies 12 and 13 may each include rotor-stator assemblies. For example, the first assembly 12 may include a generator stator 30, which is fixedly connected to the second sidewall 24 and an externally driven generator rotor 31 that is operably disposed within a central region defined by the generator stator 30. Rotation of the generator rotor 31 induces a current in the generator stator 30. Where the apparatus 10 is installed in a vehicle, the apparatus 10 may further include a drive power generation device 40, such as an engine, to drive the rotation of the generator rotor 31 by way of a drive power generation device shaft 41. In accordance with further embodiments, it is to be understood that the first and second assemblies 12 and 13 may each include various stages of, for example, rotor-stator assemblies and, in this way, provide for additional driving power and/or step-wise increases in driving power equivalent to gear-shifting.

The second assembly 13 may include a drive stator 50, which is fixedly connected to the first sidewall 22, and a drive rotor 51. The drive rotor 51 is operably disposed within a central region defined by the drive stator 50. As such, current applied to the drive stator 50 induces rotation of the drive rotor 51. The rotation of the drive rotor 51 drives external mechanical elements 60, such as drivable devices requiring speed/torque modulation or wheels where the apparatus 10 is installed in a vehicle, via drive shaft 61. The current applied to the drive stator 50 may be the current associated with the current generated by the first assembly 12.

As shown in FIG. 3, the apparatus 10 further includes a first inverter 70 and a second inverter 71. The first inverter 70 is electrically coupled to the first assembly 12 and converts alternating current (AC), which is generated by the first assembly 12, as described above, into direct current (DC). The second inverter 71 is electrically interposed between the first inverter 70 and the second assembly 13 and converts the direct current produced by the first inverter 70 back to alternating current that can be used to drive operations of the second assembly 13. In accordance with further embodiments, control provided by the first and second inverters 70, 71 can affect either or both of the magnitude and frequency of the currents (AC or DC).

That is, in the example given above, as the drive power generation device 40 causes the drive power generation device shaft 41 to rotate, the rotation of the drive power generation device shaft 41 drives rotation of the generator rotor 31. The rotation of the generator rotor 31 induces an alternating current in the generator stator 30. With the first inverter 70 electrically coupled to the generator stator 30, this alternating current is converted into direct current, which is converted back to alternating current by the second inverter 71. With the drive stator 50 electrically coupled to the second inverter 71, this alternating current is applied to the drive stator 50 to cause the rotation of the drive rotor 51. Mechanical energy of the rotation of the drive rotor 51 is then transferred to the mechanical elements 60 via the drive shaft 61.

Figure 4:
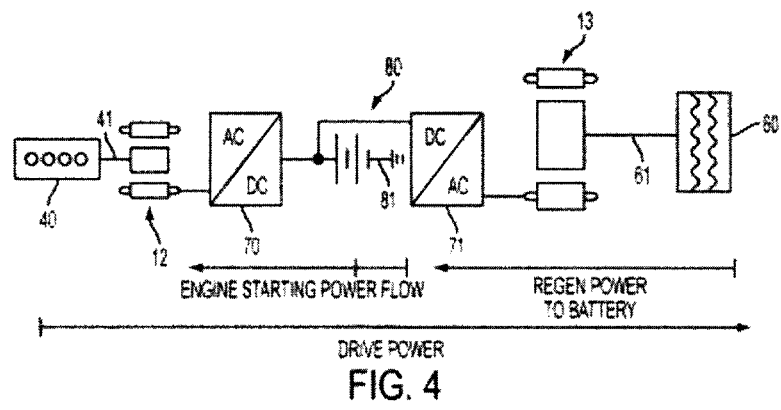
FIG. 4 is a schematic circuit diagram of further embodiments of the concentric motor power generation and drive system apparatus.

In accordance with further embodiments and, with reference to FIG. 4, the apparatus 10 may further include an energy capture circuit 80. The energy capture circuit 80 is electrically interposed between the first and second assemblies 12 and 13 and is configured to capture electrical energy from the current generated in at least the first assembly 12. The energy capture circuit 80 includes the first inverter 70, as described above, the second inverter 71, as described above, and a storage device 81, such as a battery or an ultra capacitor. The storage device 81 is disposed in series with the first and second inverter 71 to store electrical energy derived from output of the first inverter 70 or the second inverter 71 depending on which direction the first and second inverters 70, 71 are commanded. Thus, one inverter can be employed for charging the storage device 81 while the other is employed for driving power or both may be employed for charging or driving.

During normal operations, drive power flows from the drive power generation device 40, through the first assembly 12, the first and second inverters 70, 71, the energy capture circuit 80 and the second assembly 13 and to the mechanical elements 60. During drive power generation device startup, however, a polarity of the first inverter 70 can be reversed in accordance with known methods such that drive power can flow from the storage device 81 to the drive power generation device 40. In this case, electricity stored in the storage device 81 is transmitted to the first inverter 70 where it is converted from direct current to alternating current. The alternating current is then transmitted to the generator stator 30 to cause the generator rotor 31 to rotate. The rotation of the generator rotor 31 causes or assists with the startup of the drive power generation device 40. In addition, during certain driving conditions, such as downhill driving, the storage device can be receptive of power from the second assembly 13. In this case, a polarity of the second inverter 71 can be reversed and mechanical energy of the mechanical element 61 can be converted into alternating current by the second assembly and then converted into direct current by the second inverter 71. This direct current can be input to the storage device 81.

Figure 5:
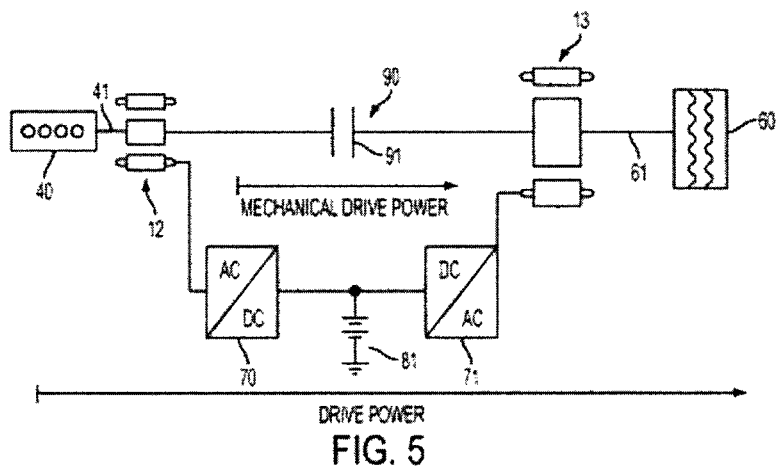
FIG. 5 is a schematic circuit diagram of further embodiments of the concentric motor power generation and drive system apparatus.

In accordance with still further embodiments and, with reference to FIG. 5, the apparatus 10 may further include the energy capture circuit 80, as described above with reference to FIG. 4, such that charging of the storage device 81 is possible, and a first coupling 90. The first coupling 90 mechanically couples the first and second assemblies 12 and 13 such that at least a portion of the input mechanical energy is transferred from the first assembly 12 to the second assembly 13. To this end, the first coupling 90 may include a first clutch 91 that is respectively coupled to the first and second assemblies 12 and 13. In these further embodiments, during relatively high-speed travel, the ability to transfer drive power from the first assembly 12 and directly to the second assembly 13 via the first clutch 91 increases an efficiency of the apparatus 10.

Figure 6:
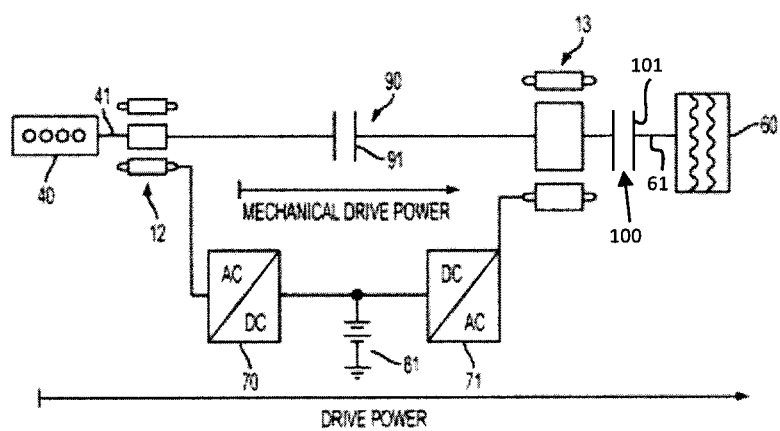
FIG. 6 is a schematic circuit diagram of further embodiments of the concentric motor power generation and drive system apparatus.

In accordance with still further embodiments and, with reference to FIG. 6, the apparatus 10 may further include the first clutch 91 of the first coupling 90 and a second clutch 101 of a second coupling 100. Where the first coupling 90 mechanically couples the first and second assemblies 12 and 13 such that at least a portion of the input mechanical energy is transferable from the first assembly 12 to the second assembly 13, the second coupling 100 mechanically couples the second assembly 13 and the external mechanical elements 60 such that at least a portion of the input mechanical energy is transferable from the second assembly 13 to the external mechanical elements 60.

In a power generation mode, the second clutch 100 is operable in an open condition (i.e., the second clutch is opened such that rotation is not transmitted to the external mechanical elements 60) and one or both of the first and second assemblies 12 and 13 is operable to generate power or energy to be supplied to the storage device 81. That is, if the first clutch 91 and the second clutch 100 are both opened while the drive power generation device 40 is operated, the external mechanical elements 60 will not be driven and the first assembly 12 will generate power or energy to be supplied to the storage device 81. By contrast, if the first clutch 91 is closed and the second clutch 100 is opened while the drive power generation device 40 is operated, the external mechanical elements 60 will not be driven and the first and second assemblies 12 and 13 will both be available to generate power or energy to be supplied to the storage device 81.

In a case where the first clutch 91 and the second clutch 100 are both closed, the apparatus 10 will operate similarly as described above with reference to FIG. 5. That is, at least a portion of input mechanical energy will be transferable from the first assembly 12 to the second assembly 13 and, during relatively high-speed operations of the apparatus 10, this can increase an efficiency of the apparatus 10. With that said, one or both of the first and second assemblies 12 and 13 may be provided as induction or switch reluctance motors that can be selectively turned on and off in accordance with current operating conditions. As such, with the first clutch 91 and the second clutch 100 both closed, one or both of the first and second assemblies may be turned off for relatively high efficiency operations or on for relatively high power operations. In an exemplary embodiment, such high power operations may be particularly useful for cases in which engine downsizing is in effect and temporary high power operations (i.e., uphill driving or load transport) are required.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An apparatus, comprising:
a hub, including opposing faces, a first sidewall fixed to the opposing faces to define a first interior and a second sidewall fixed to one of the opposing faces to define a second interior within the first interior;
a first assembly, disposed within the second interior, to generate current from input mechanical energy;
a second assembly, electrically coupled to the first assembly and disposed within the first interior, to generate mechanical energy to be transmitted to external mechanical elements from current associated with the current generated by the first assembly; and
first and second couplings, the first coupling being a clutch disposed to mechanically couple the first and second assemblies such that at least a portion of the input mechanical energy is transferable from the first assembly to the second assembly and the second coupling being a clutch disposed to mechanically couple the second assembly and the external mechanical elements.

2. The apparatus according to claim 1, wherein at least one or both of the first and second assemblies is provided as an induction motor.

3. The apparatus according to claim 1, wherein at least one or both of the first and second assemblies is provided as a switched reluctance motor.

4. The apparatus according to claim 1, wherein the first coupling clutch is respectively coupled to the first and second assemblies.

5. The apparatus according to claim 1, wherein the second coupling clutch is respectively coupled to the second assembly and the external mechanical elements.

6. The apparatus according to claim 1, further comprising an energy capture circuit electrically interposed between the first and second assemblies to capture electrical energy from the generated current.

7. The apparatus according to claim 1, further comprising a drive power generation device to provide drive power as the input mechanical energy,
wherein the drive power is transferred from the first assembly to the second assembly by the first coupling and from the second assembly to the external mechanical elements by the second coupling.

8. An apparatus, comprising:
a hub, including opposing faces, a first sidewall fixed to the opposing faces to define a first interior and a second sidewall fixed to one of the opposing faces to define a second interior within the first interior;
a first assembly, disposed within the second interior, to generate current from input mechanical energy;
a second assembly, electrically coupled to the first assembly and disposed within the first interior, to generate mechanical energy to be transmitted to external mechanical elements from current associated with the current generated by the first assembly;
first and second couplings, the first coupling being disposed to mechanically couple the first and second assemblies and the second coupling being disposed to mechanically couple the second assembly and the external mechanical elements; and
an energy capture circuit electrically interposed between the first and second assemblies to capture electrical energy from the generated current,
wherein at least one or both of the first and second assemblies are configured to supply energy to the energy capture circuit with the second coupling disposed in an open condition.

9. An apparatus, comprising:
a hub, including first and second opposing faces, a first sidewall fixed at opposite ends thereof to the first and second opposing faces to define a first interior between the first and second opposing faces and a second sidewall fixed to one of the first and second opposing faces to define a second interior within the first interior;
a first assembly, disposed within the second interior, to generate current from input mechanical energy;
a second assembly, electrically coupled to the first assembly and disposed within the first interior, to generate mechanical energy to be transmitted to external mechanical elements from current associated with the current generated by the first assembly; and first and second couplings, the first coupling being disposed to mechanically couple the first and second assemblies and the second coupling being disposed to mechanically couple the second assembly and the external mechanical elements such that the input mechanical energy is respectively transferable from the first assembly to the second assembly and from the second assembly to the external mechanical elements.

10. The apparatus according to claim 9, wherein at least one or both of the first and second assemblies is provided as an induction motor.

11. The apparatus according to claim 9, wherein at least one or both of the first and second assemblies is provided as a switched reluctance motor.

12. The apparatus according to claim 9, wherein the first coupling comprises a clutch respectively coupled to the first and second assemblies.

13. The apparatus according to claim 9, wherein the second coupling comprises a clutch respectively coupled to the second assembly and the external mechanical elements.

14. The apparatus according to claim 9, further comprising an energy capture circuit electrically interposed between the first and second assemblies to capture electrical energy from the generated current.

15. The apparatus according to claim 14, wherein at least one or both of the first and second assemblies are configured to supply energy to the energy capture circuit with the second coupling disposed in an open condition.

16. The apparatus according to claim 9, further comprising a drive power generation device to provide drive power as the input mechanical energy, wherein the drive power is transferred from the first assembly to the second assembly by the first coupling and from the second assembly to the external mechanical elements by the second coupling.

17. An apparatus, comprising:

a hub, including opposing faces, a first sidewall fixed to the opposing faces to define a first interior and a second sidewall fixed to one of the opposing faces to define a second interior within the first interior;

a first assembly, disposed within the second interior, to generate current from input mechanical energy;

a second assembly, electrically coupled to the first assembly and disposed within the first interior, to generate mechanical energy to be transmitted to external mechanical elements from current associated with the current generated by the first assembly;

a first coupling disposed to mechanically couple the first and second assemblies; and a second coupling disposed to mechanically couple the second assembly and the external mechanical elements, the second coupling being operable in an open condition in a power generation mode.

18. The apparatus according to claim 17, further comprising an energy capture circuit electrically interposed between the first and second assemblies to capture electrical energy from the generated current in the power generation mode.

* * * * *